Aug. 15, 1967 W. H. V. LARNER, JR., ET AL 3,336,183
LEATHER-LIKE COMPOSITION
Filed Dec. 19, 1962
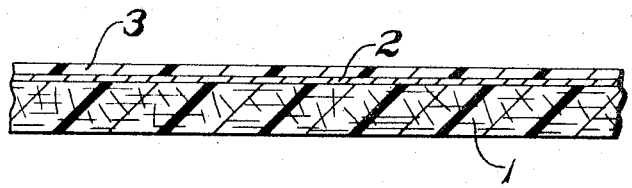

United States Patent Office 3,336,183
Patented Aug. 15, 1967

3,336,183
LEATHER-LIKE COMPOSITION
William H. V. Larner, Jr., Hinckley, Eric Reutern, Cuyahoga Falls, and Stephen T. Semegen, Hudson, Ohio, assignors to The B. F. Goodrich Company, New York, N.Y., a corporation of New York
Filed Dec. 19, 1962, Ser. No. 245,795
4 Claims. (Cl. 161—156)

This invention relates to a leather-like composition comprising a unique combination of a particular non-woven fibrous material backing layer, a particular carboxylic acrylic latex binder in the non-woven backing layer, a cellulosic fiber interlayer and a particular polyester-urethane surface layer.

Artificial or simulated synthetic leather substitutes are well known. Much effort has been expended, with only partial success, in attempts to adapt synthetic polymers as replacements in uses where leather is employed. Some of the synthetic compositions which have been used recently in attempts to replace leather have been vinyl polymers, mixtures of rubbers and vinyl polymers and combinations of woven and non-woven fabrics treated with similar synthetic polymers. None of these materials has been fully satisfactory as a leather replacement. Although many of them are outstanding in some aspects, they are ordinarily seriously deficient in one or more desirable or vital properties. From an application viewpoint one of the most notable failures of the substitute materials proposed to date has been lack of leather-like appearance. Further, most of the plastic materials which have been used as leather substitutes, such as various vinyl polymers, have extremely low moisture permeability and poor lastability, that is, the ability to form properly on a shoe last without exhibiting unwanted wrinkling, puckering and drawing.

It is among the objects of this invention to provide leather-like compositions which have the pleasing surface appearance and feel of leather, moisture permeability equivalent to leather and lastability equivalent to leather.

These and other objects are accomplished through the use of a combination structure of certain particular materials comprising a non-woven backing fabric consisting of polypropylene, a hereinafter defined synthetic latex saturant in the non-woven fabric, a cellulose fabric interlayer and a particular polyesterurethane combined with vinyl resin as a microporous surface layer, which total composition has a leather-like appearance and feel, satisfactory moisture permeability, and outstanding abrasion resistance which is superior to that of leather. A mixture of polypropylene and a hydrophilic non-woven fiber such as rayon or cotton, which may be added to improve moisture absorption of the non-woven layer, can also be employed as the base stratum.

Coated fabrics as a class do not possess the ability to "breathe" or transpire water vapor and air. For suitable use in shoes, boots, gloves and the like which enclose or cover a part of the human body, this property is a prime prerequisite. If moisture from the body cannot escape through the article, hands and feet for instance, in the case of gloves and shoes, will feel and actually be damp. Such articles are uncomfortable, and in the case of feet may cause dermatological troubles. By means of this invention a satisfactory leather-like material is provided which has moisture permeability equivalent to that of leather and such materials find ready and acceptable use in gloves and shoes.

The combination of our invention may be readily understood by reference to the cross section drawing in which the base stratum 1 is a non-woven polypropylene fabric containing about 5–15% by weight of synthetic latex binder to which is later added enough synthetic latex saturant to give a total of 50–150% by weight of combined binder and saturant. This non-woven fabric layer is 7 to 100 mils in thickness. Above and adjacent to the base stratum is a cellulose interlayer prepared by the conventional wet papermaking process, containing 15% to 50% by weight of synthetic latex saturant and having a thickness of 8 to 17 mils 2, finally, above and adjacent to the interlayer is the microporous surface layer of polyurethane-vinyl resin 3 which has a thickness of 5 to 30 mils. The total combination will range from 20 to 147 mils in thickness.

A non-woven fibrous backing material or fabric is essential to attain the advantages of this invention. The non-woven fibrous material is necessary to obtain a composition which has a leather-like appearance and the required moisture permeability. Woven fabrics which have been combined with some polyurethanes do not have a leather-like appearance nor the moisture permeability of the degree required for successful use in many leather applications.

Non-woven fabrics are well known and are variously defined as felts, mats, and the like. They embody natural or artificial fibers formed into a web or bat by carding, garnetting, air-laying, water-laying or other methods known in the art. The non-woven fabrics contain randomly distributed short staple fibers. The non-woven webs of fibers can be made in various thicknesses and densities and are usually bonded together by the application of a minor amount of a binder adhesive which can be applied by spraying, immersion and the like. The binder adhesives preferred by us are synthetic latices of lower alkyl acrylate or methacrylate polymers. The binder is usually present in an amount of 5–25% by weight of the non-woven fabric. Should heavier or thicker layers be desired than are readily produced by the manufacturer, layers of non-woven fabric can be plied together and adhered into one effective layer. The non-woven fibrous material used in the practice of this invention is polypropylene or may be a blend of polypropylene and rayon or cotton fibers which offers the unique combination of properties required. Fiber deniers up to 25 and higher can be used but finer denier fibers are found to produce more leather-like properties. Preferred fiber denier is slightly less than 1 to about 3. The fibers may be coated prior to the matting operation or the mats may be treated with the usual coating materials such as starch, polyvinyl alcohol, sizings, polyesters and other polymers.

The non-woven fabrics may be used in uncompressed and uncalendered thicknesses of about $\frac{1}{64}$ inch to 1 inch or thicker, or they may be calendered. Preferably, single ply uncalendered materials from about $\frac{1}{32}$ inch to $\frac{1}{2}$ inch apparent thickness are employed; multiple plies built up to these thicknesses are also useful. The density of the mat materials may be varied quite widely, and in terms of ounces per linear yards may vary, depending upon the nature of the fibers, from about 0.05 ounce to about 9 to 10 ounces. In the case of polypropylene fabric, weights from about 2 ounces to about 5 ounces per linear yard are preferably employed in thicknesses from about $\frac{1}{32}$ inch to about $\frac{3}{32}$ inch. It is often desirable to have the non-woven fabric mat or web given a certain degree of orientation by needle-punching on a loom that will pierce the mat up to 20,000 times per square inch with needles from 1 to 10 mils in diameter. Needle-punched non-woven fabrics seem to have lasting ability that is superior to similar non-punched fabrics when formed into leather-like constructions.

We find that polypropylene non-woven fabrics form an improved base stratum for a leather-like composition, particularly one intended for use in shoe upper material, compared to base strata disclosed in the art, because of superior lastability, moldability and good draft characteristics as compared to nylon and polyester fibers, for instance. As polypropylene is inherently a hydrophobic material and will absorb only fairly low amounts of moisture, we may find it advantageous to blend about 80% polypropylene non-woven fabric and 20% rayon non-woven fabric by weight to form the base stratum for our leather-like composition. These non-woven fabrics have the ability to take up moisture such as that produced by the human foot and pass it on through the balance of the composition of our invention. This property contributes to the comfort factor when the combination is formed into a shoe upper and worn on the foot as part of a shoe.

The non-woven fabric is dipped into a saturant material to give it strength, integrity and dimensional stability. The fabric is made to pick up 50% to 200% of its weight of saturant. Less saturant than this does not give uniform coverage of the non-woven fiber and greater amounts lead to rubbery, non-leatherlike appearance. We achieve this saturant pickup by dipping the non-woven fabric which can be obtained in roll form from the manufacturers, into an aqueous dispersion of a carboxylic-modified acrylic or methacrylic latex, a carboxylic modified styrene-butadiene latex, or a carboxylic modified butadiene-acrylonitrile latex. When compared to non-carboxylic modified latices, carboxylic modified materials show improved adhesion as saturants and contribute to a better overall appearance of non-leatherlike construction. A commercial form of such an acrylic latex is available from the B. F. Goodrich Chemical Company as Hycar 2600X83. A commercial form of such a styrene-butadiene latex is available from the same company as code 2570X5. A commercial form of a carboxylic butadiene-acrylonitrile latex is available from the same company as Hycar 2671. Any carboxylic modified acrylate, styrene-butadiene, or butadiene-acrylonitrile latex is useful for this operation. These materials are produced by polymerizing in an acidic aqueous medium a monomeric mixture comprising at least 55% by weight of one or more alkyl acrylates or butadiene-1,3 hydrocarbons and 1–45% by weight of an unsaturated acid monomer. Acrylate monomers useful in preparing these saturant latices include methyl, ethyl, propyl, butyl, and 2-ethylhexyl acrylates. Butadiene-1,3 hydrocarbons suitable for use in preparing saturant latices include butadiene-1,3, isoprene, piperylene, and the like. Carboxyl modification is obtained by employing unsaturated monomeric acidic materials such as acrylic acid and methacrylic acid. Typical carboxyl modified latex combinations include:

ethyl acrylate/methacrylic acid
ethyl acrylate/acrylic acid
methyl acrylate/methacrylic acid
methyl acrylate/acrylic acid
butyl acrylate/methacrylic acid
butyl acrylate/acrylic acid
butadiene/styrene/methacrylic acid
butadiene/styrene/acrylic acid
butadiene/acrylonitrile/methacrylic acid
butadiene/acrylonitrile/acrylic acid
butyl acrylate/butyl methacrylate/methacrylic acid
butyl acrylate/butyl methacrylate/acrylic acid
butadiene/methyl methacrylate/methacrylic acid
butadiene/methyl methacrylate/acrylic acid
2-ethyl hexyl acrylate/methacrylic acid
2-ethyl hexyl acrylate/acrylic acid
butadiene/styrene/acrylonitrile/methacrylic acid
butadiene/styrene/acrylonitrile/acrylic acid The proportions of the essential monomeric materials in the monomeric mixture may be varied so long as the total of acrylate ester or butadiene monomer is at least 55% of the total by weight. As little as 1% of acid by weight of the total monomers produces an observable influence on the properties of the polymeric latex as compared with a 100% acrylate latex or a 100% polybutadiene latex. The monomeric proportions are so selected as to yield after polymerization an interpolymer latex containing certain amounts of free carboxyl (—COOH) groups. The percentage of acids in the monomeric mixture does not indicate the carboxyl content of the interpolymer obtained, so this is defined in terms of chemical equivalents of carboxyl (COOH) per 100 parts of interpolymer rubber and is often referred to as e.p.h.r. ("equivalents per hundred rubber"). This value is easily determined, for example, by titration of a polymer solution with alcoholic KOH to a phenol phthalein end-point. Carboxyl modified latices with an e.p.h.r. of 0.001 to 0.30 of carboxyl are preferred for use in this invention.

The cellulose fabric interlayer serves the purpose of preventing the design or markings of the fibers in the non-woven fabric of the base stratum from striking through and appearing as mars or imperfections on the thin surface layer. The interlayer also seems to fit better and more smoothly against the surface layer than does the unprotected base stratum. When samples of base stratum, interlayer and surface layer are compared on a lasting device with samples of base stratum adhered directly to the surface layer, the former are found to have excellent lastability, while the latter tend to show wrinkles and puckers, as well as the effect of the base stratum design striking through to the surface. These problems cannot be overcome by merely increasing the thickness of the surface layer. Such a step increases costs greatly since the surface layer material is far more expensive than the cellulose interlayer of equivalent thickness, and if the surface layer is made as thick as it would have to be to keep the design of the base stratum from striking through, it would not last satisfactorily itself. The cellulose interlayer we prefer to employ is approximately 8–15 mils, preferably 10 mils, thick, and based on a sheeted form of cellulose made by the wet papermaking process and saturated with 15–50% by weight of a carboxylic modified latex, preferably 35%. Less saturant does not give uniform coverage and the strength is too low, whereas greater amounts of saturant make the interlayer too rubbery. A typical preferred cellulose interlayer is commercially available from Kimberly-Clark Corporation under the code S–11162. The same saturant latices are employed in the interlayer as were previously set forth as binders for the non-woven fabric. Non-carboxylic NBR and SBR saturants have been employed in place of the carboxyl modified saturants but they give poorer adhesion, less compatibility and create color problems. Other interlayer materials such as vinyl or polyurethane foam, and natural or synthetic rubber sponge can be employed, but we have found the cellulose interlayer to give the very best and most preferred leather-like properties in the finished composition.

The surface layer employed in our leather-like composition is a film formed from a mixture of 65–85 parts of a polyesterurethane and 35–15 parts of a polyvinyl chloride resin. A preferred mixture is 80 parts polyesterurethane and 20 parts of polyvinyl chloride resin. The vinyl resin contributes to the leather-like feel of our material and gives it improved calendering properties and the polyesterurethane makes the combination extremely tough and resistant to scuffing, abrasion and cracking with little polishing needed to maintain the clean, shiny appearance desired on shoes and leather articles. The preparation of the polyesterurethane is fully described in United States Patent 2,871,218. It is a tough, essentially linear polyesterurethane characterized by being thermoplastic, extrudable to a film and substantially free of cross-links. This material is also soluble in dimethyl formamide and tetrahydrofuran and may be formed into a layer of desired thickness by spreading as a cement and evaporating the solvent. It is prepared by heating a mixture comprising (1) one mol of an essentially linear hydroxyl terminated polyester of a saturated aliphatic glycol having from 4 to 10 carbon atoms and having hydroxyl groups on its terminal carbon atoms, and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted isocyanate or hydroxyl groups in the reaction product. A mixture of such a polyesterurethane and compatible polyvinyl resin is available from B. F. Goodrich Chemical Company as Estane 58029. This material has a durometer hardness of 95 on the A scale and 45 on the D scale and a specific gravity of 1.25. By virtue of the fact that it incorporates lower cost vinyl resins, this material is also more economical to use than the pure Estane.

In itself this polyesterurethane-vinyl layer, 5 to 30 mils in thickness is impermeable to water vapor, a feature which would lead to discomfort in the wearing of the shoes made therefrom. The non-woven polypropylene fabric and the paper like interlayer employed in our leather-like combination are highly permeably by virtue of the construction. We have introduced permeability into the film by incorporating from 100 to 300 parts of ammonium bicarbonate per 100 parts of polymer in the polymer mix. After the film is extruded, or formed by cement spreading and evaporation of the solvent, it is passed through an oven or wet steam autoclave at 100° C. to remove the bicarbonate particles which form gaseous carbon dioxide, gaseous ammonia and water vapor that evolve leaving minute openings through the surface layer. Water vapor, transpired from the wearer's body through the permeable base stratum and cellulose interlayers is thus easily passed off from our leather-like composition. Another way to achieve permeability when an extruded polyesterurethane-vinyl film is employed as the surface layer, is to punch it with multitudinous needle punches, up to 30,000 per square inch, as can be done with needle punch looms known in the art.

Different means may be employed to form the sandwich combination of our invention. A uniform first step is to impregnate the non-woven fabric with the latex binder. To adhere the impregnated fabric to the cellulose interlayer, any appropriate adhesive may be employed, provided only that it not form an impermeable layer as it is processed. If this is the tendency of the particular adhesive selected, we add to it from 100 to 200 parts of ammonium bicarbonate based on the adhesive polymer. We have successfully used as a cement adhesive a solution of the polyurethane surface material in tetrahydrofuran, which contains 20 to 60 parts of polymer by weight in 100 parts of solution and 20 to 120 parts of ammonium bicarbonate by weight to insure that an impermeable film layer will not be formed. This step may be performed on a calender or any other suitable equipment for spreading an adhesive layer on one of two surfaces and bringing the two surfaces together. The surface layer of polyurethane-vinyl may be applied in alternate ways. It may be preformed into a film and calendered or otherwise applied to the upper interlayer surface, in which case an adhesive layer such as was used in the step above, is employed between the cellulose interlayer and the surface layer. This operation may be conducted as a separate step after the interlayer is adhered to the non-woven fabric, or a double calender can be employed to simultaneously adhere the non-woven fabric to the lower side of the cellulose interlayer and the polyesterurethane film to the upper surface of the interlayer.

Alternatively, the polyesterurethane surface layer may be deposited from a cement solution and spread to give a layer of desired thickness, generally from 5 to 30 mils after the solvent has been removed.

The final combination is heated for the equivalent of 2 hours at 100° C. to remove the ammonium bicarbonate and insure overall permeability.

The following example will illustrate the practice of our invention.

*Example 1*

One hundred yards of polypropylene non-woven fabric weighing 5 oz. per sq. yd. and formed of 3 denier, random web, cross-laid, needled material containing 10% Rhoplex B-15 acrylate polymer dispersion (a 46% solids aqueous emulsion of a terpolymer which is predominantly ethyl acrylate, containing minor amounts of methyl acrylate and acrylic acid, sold by Rohm & Haas. Compositions of this type are disclosed in United States Patents 2,790,735 and 2,790,736) and 5% Hycar 2671 (carboxylic terpolymer of butadiene/acrylonitrile/acrylic acid from B. F. Goodrich Chemical Company) by weight was dipped in a tank of 50% aqueous latex binder comprised of Hycar 2600X83, a carboxyl modified acrylic latex comprising a copolymer of 98% by weight ethyl acrylate and a minor amount of methacrylic acid. The dipped sheet was drawn through squeeze rolls set at pressure necessary to remove excess solution and leave a solids pick up in the range of 75% to 200% of the weight of fabric. The impregnated fabric sheet was dried and air-cured on heater rolls at 260° F. for 10 minutes. The dried sheet weighed 11 oz. per sq. yd., a binder pick up of 122%.

The dry non-woven fabric sheet was spread on one side with an adhesive consisting of a 23% solution of polyesterurethane (Estane 5740X1 from B. F. Goodrich Chemical Company) in tetrahydrofuran, containing one part ammonium bicarbonate for each part of polyesterurethane. Compositions of this type are disclosed in United States Patent 2,871,218.

A wet paper process cellulose layer containing 35% latex binder comprising a copolymer of 98% by weight ethyl acrylate and a minor amount of methacrylic acid, weighing 5 oz. per sq. yd. (Code S-11162, Kimberly-Clark Corporation) was calendered on to the non-woven fabric giving a construction weighing 17 ounces per sq. yd. and totaling 37 mils in thickness. This construction was air dried.

The upper surface of the cellulose interlayer was spread with an adhesive consisting of a 21% solution by weight of Estane 5740X1 in tetrahydrofuran containing one part ammonium bicarbonate per part of polyesterurethane. The structure was dried at room temperature to remove the solvent. It now weighed 27 oz. per sq. yd. and was 47 mils thick and was placed in a wet steam autoclave for 2 hours at 100° C. to remove the ammonium bicarbonate and insure permeability. Finally the construction was compressed between calender rolls to a thickness of 45 mils at 140° C. at 300 pounds per lineal inch pressure and a sheet 45 mils thick, weighing 22 oz. per sq. yd. was formed which had the properties listed below:

TABLE 1

| Properties | | Calfskin leather control |
|---|---|---|
| Surface appearance | (1) | (1) |
| Gms., water/day/sq. meter (permeability) | 320 | 780 |
| Graves tear, lbs./in. | 42 | 56 |
| Abrasion (mg. loss/1,500 cycles) | 16.8 | 122.5 |
| Scuff resistance | (1) | (2) |
| Tensile, p.s.i. | 1,300 | 325 |
| Elongation, percent | 177 | 50 |

¹ Excellent.
² Fair.

When formed on a lasting machine duplicating the configuration of a shoe toe, this construction assumed the shape without evidence of wrinkling or puckering. By visual observation it lasted on a par with a piece of top grain calf hide.

Shoes were made from the material and worn. Comfort and durability of the shoes were comparable to those of leather shoes. Scuff and abrasion resistance and maintenance of shine were superior to those of leather shoes.

We claim:

1. A synthetic leather construction comprising the combination consisting of (1) a base stratum from 7 to 100 mils in thickness of polypropylene non-woven fabric containing 50–150% by weight of a carboxylic modified latex saturant, said latex having been made by polymerizing in an acidic aqueous medium a monomeric mixture comprising monomers selected from the group consisting of alkyl acrylates, mixtures of butadiene and alkyl acrylates, mixtures of butadiene-acrylonitrile, mixtures of butadiene-styrene and mixtures of butadiene-styrene-acrylonitrile wherein the alkyl acrylate or the butadiene component, or the sum of the alkyl acrylate and the butadiene component is at least 55% of the total monomer mixture, and 1–45% by weight of the total monomer mixture of an unsaturated acid monomer selected from the group consisting of acrylic acid and methacrylic acid, (2) an interlayer of wet paper process cellulose fiber from 8 to 17 mils in thickness containing 15 to 50% by weight of a carboxylic modified latex saturant, and (3) a permeable surface layer from 5 to 30 mils in thickness of polyesterurethane-polyvinyl chloride resin, said polyesterurethane being essentially linear and characterized by being thermoplastic, extrudable to a film, and substantially free of crosslinks.

2. The method of making a leather-like composition comprising preparing a base stratum of polypropylene non-woven fabric from 7 to 100 mils in thickness, saturating said fabric with from 50–150% by weight of a carboxylic modified latex, said latex having been made by polymerizing in an acidic aqueous medium a monomeric mixture comprising monomers selected from the group consisting of alkyl acrylates, mixtures of butadiene and alkyl acrylates, mixtures of butadiene-acrylonitrile, mixtures of butadiene-styrene and mixtures of butadiene-styrene-acrylonitrile wherein the alkyl acrylate or the butadiene component, or the sum of the alkyl acrylate and the butadiene component is at least 55% of the total monomer mixture, and 1–45% by weight of the total monomer mixture of an unsaturated acid monomer selected from the group consisting of acrylic acid and methacrylic acid, adhering to one side of said base stratum an interlayer from 8 to 17 mils in thickness of wet paper process cellulose fiber, said interlayer being saturated with 15–50% by weight of a carboxylic modified latex, adhering to the exposed surface of said interlayer a surface layer from 5 to 30 mils in thickness of polyesterurethane-polyvinyl chloride, said polyesterurethane being essentially linear and characterized by being thermoplastic, extrudable to a film, and substantially free of crosslinks, said surface layer having been made permeable by the heat decomposition of 100–200 parts of ammonium bicarbonate per 100 parts of polyesterurethane-polyvinyl chloride, and compressing the entire plied construction to an overall thickness of 20 to 147 mils.

3. The synthetic leather construction of claim 1 wherein the carboxylic modified latex saturant in the base polypropylene stratum and in the cellulose fiber interlayer is a latex selected from the group consisting of carboxylic modified acrylic latex, carboxylic modified methacrylic latex, carboxylic modified styrene-butadiene latex, and carboxylic modified butadiene-acrylonitrile latex, and the permeable surface layer is a combination of an essentially linear, thermoplastic polyesterurethane and a polyvinyl chloride resin.

4. The synthetic leather construction of claim 1 wherein the base stratum of non-woven polypropylene and the interlayer of cellulose fiber are saturated with carboxylic modified acrylic latex, and the permeable surface layer is a combination of 65–85 parts by weight of an essentially linear, thermoplastic polyesterurethane and 35–15 parts by weight of a polyvinyl chloride resin.

References Cited
UNITED STATES PATENTS

| 2,700,630 | 1/1955 | Bukey et al. | |
| 2,948,650 | 8/1960 | Jackson et al. | 161—159 XR |
| 3,100,721 | 8/1963 | Holden | 117—135.5 |

FOREIGN PATENTS

| 560,682 | 7/1958 | Canada. |

OTHER REFERENCES

Wall Street Journal, vol. CLIX, No. 36, pp. 1, 12, Feb. 20, 1962.

JACOB H. STEINBERG, *Primary Examiner.*

EARL M. BERGERT, ALEXANDER WYMAN, *Examiners.*

L. T. PIRKEY, R. J. ROCHE, *Assistant Examiners.*